No. 611,995. Patented Oct. 4, 1898.
E. P. FOLLETT.
INSTRUMENT FOR LAYING OUT GORES FOR SKIRTS.
(Application filed Oct. 27, 1897.)
(No Model.)
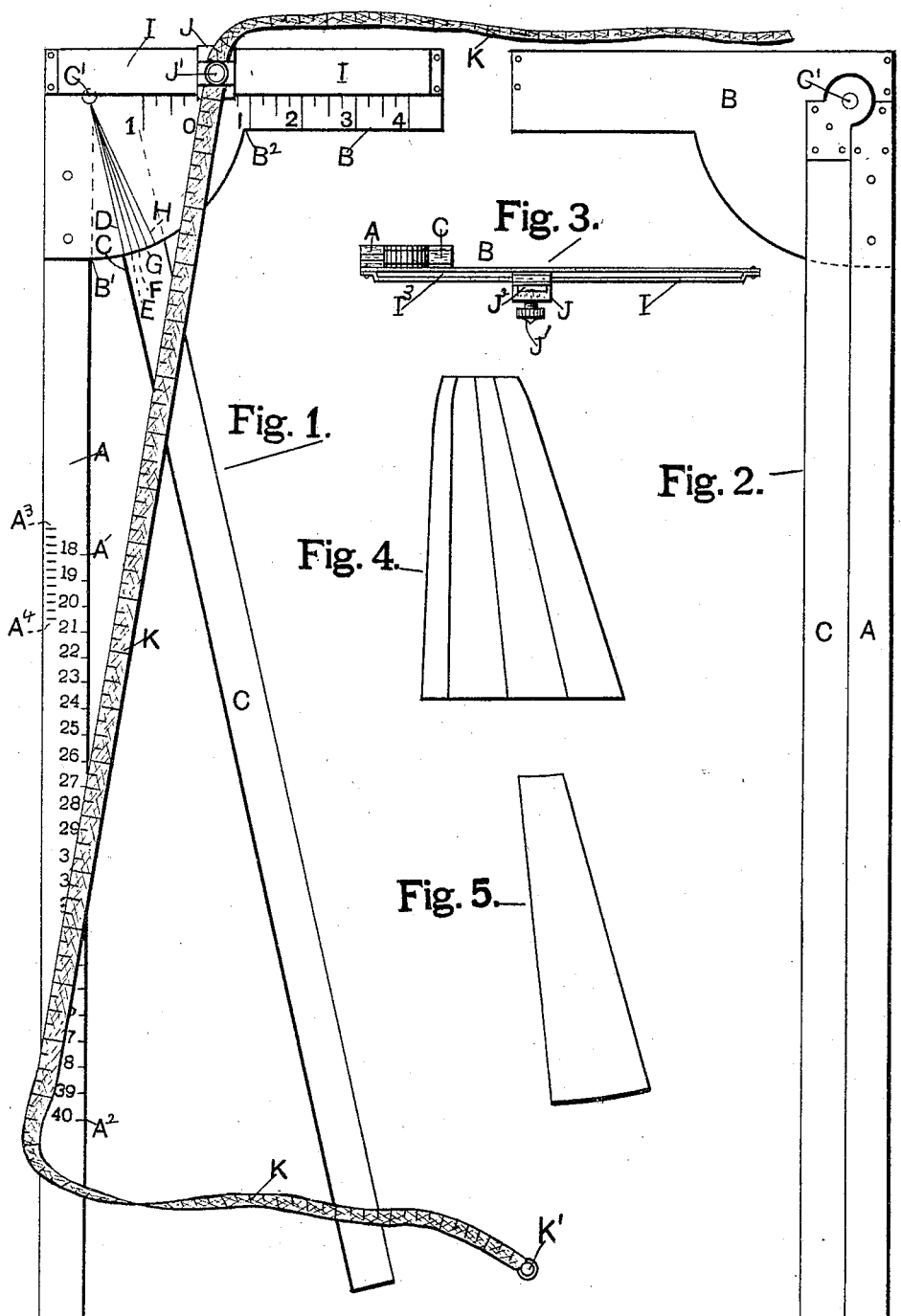
WITNESSES:
H. H. Hale.
Saml. J. Marcy.
INVENTOR:
Edward P. Follett
By his atty, Oscar Snell.

UNITED STATES PATENT OFFICE.

EDWARD P. FOLLETT, OF CHICAGO, ILLINOIS.

INSTRUMENT FOR LAYING OUT GORES FOR SKIRTS.

SPECIFICATION forming part of Letters Patent No. 611,995, dated October 4, 1898.

Application filed October 27, 1897. Serial No. 656,522. (No model.)

*To all whom it may concern:*

Be it known that I, EDWARD P. FOLLETT, a citizen of the United States, residing at Chicago, in the county of Cook and State of Illinois, have invented a new and useful Instrument for Laying Out Gores for Skirts, of which the following is a specification.

My invention relates to means for laying out gores for ladies' dress-skirts, cloaks, and other similar garments or forms, and my object is to produce a simple and efficient instrument for this purpose which may be quickly and easily understood by a person of ordinary skill, the same being fully described hereinafter, and illustrated in the accompanying drawings, in which—

Figure 1 is a side elevation showing an instrument in which is embodied my invention. Fig. 2 is a rear elevation to show the pivotal center of one of a pair of rules embodied in this instrument, which are in the closed position and to one of which is attached a laterally-projecting arm. Fig. 3 is a plan of what is shown in Fig. 1 to illustrate manner of mounting an adjustable measuring-tape clamp on the lateral arm of the stationary rule. Fig. 4 is a side elevation of a lady's dress-skirt, showing gores as they may appear when joined together; and Fig. 5 is a side elevation of a single gore for the purpose of illustrating the manner of using this instrument.

Similar letters indicate like parts throughout the several views.

A is a rule having a laterally-projecting arm B, which is usually made of some thin metal and attached to the rule at one end portion, as shown.

At C is a second rule, either pivoted at one end to rule A or to the arm B, with the pivotal center C' substantially coincident with the plane of the opposing faces of the two rules, so that when rule C is swung outwardly from rule A at any angle of its movement the face thereof opposing that of rule A will always coincide with its pivotal center C'.

There is a portion of arm B in the form of a quadrant—in this instance from B' to B²—and on this quadrant are radial lines D, E, F, G, and H from the pivotal point of movable rule C, which lines indicate several different angles at which the movable rule may be swung out to when the instrument is in use for laying out the usual various widths of gores which comprise a dress-skirt.

At I, Figs. 1 and 3, is a strip of metal which is bent at each end to form feet, by which it is secured to arm B and which raise the strip throughout the greater part of its length slightly above the face of the arm, whereby it is adapted to be embraced by a measuring-tape clamp J, which is provided with a binding-screw J'. Clamp J is adapted to slide along the raised strip I, so that its left-hand edge, Fig. 1, may coincide with the pivotal center of rule C or be slid outwardly to any one of the marks on the scale, which in this instance appear directly under the strip I, which scale in practice is divided into inches, which are divided into half and quarter inch divisions. The one-inch divisions are indicated by numerals and a naught, which latter is placed two inches to the right-hand side of the pivotal point of rule C, the other inch-marks being indicated right and left from this beginning-point, as shown in Fig. 1.

K indicates any ordinary tailor's tape-measure, which should be sixty inches in length.

The clamp J on arm slide-strip I is provided with a transverse slot J³, through which passes and is adjustably held the tape-measure K by means of the binder-screw J', which at the same time secures the clamp in any desired position on the strip I, as before stated.

Along near inside face of rule A is a scale extending from A' to A², the numerals opposite the scale-marks in this instance indicating the different waist-measures from eighteen inches to forty inches, inclusive, and at the left-hand side of the waist-measure, near the top thereof, is in practice a scale extending from A³ to A⁴, having numerals also indicating the different waist-measures from eighteen inches to forty inches, inclusive, which is the Godet scale. The numerals, however, are not shown in the drawings, the position of the scale only being indicated by twelve short lines.

In practice to draft a paper pattern for a front gore the rule C is first swung out to the position shown in Fig. 1, where the inside edge is even with line D of the graduations on the quadrant between B' and B². Then the inside edge of rule A is placed at the edge of the paper, so there will be room from the number indicating the waist-measure on rule A between A' and A² to draft the entire length of the gore. Then draw a line along the inside edge of rule A from the number indicating the waist-measure to the right and draw a similar line along the outside of rule C from the top of the gore. Place the number of the tape-line indicating the length of the front at the number on the rule indicating the waist-measure in the scale A' A² and hold it there until the tape is drawn tight through slide J, which is set at "0," or zero, in all ordinary cases, and the set-screw J' screwed down to fasten both the slide and tape in the desired position. Now place the point of a pencil through the eyelet K' at the end of the tape, carefully holding the instrument in position, and scribe an arc of a circle for the bottom of the gore and draw the top of the gore by placing the pencil at the number on the tape indicating length of gore and scribe the arc of a circle for top of the gore, the tape-line serving as a compass in drawing both of the above-described arcs, the screw J being the center.

The rules A and C are usually shorter than the length of a gore, so that the first lines hereinbefore described as drawn at the sides of these rules must be extended from the top of the gore down to the arc at the bottom end thereof, which completes the drawing for the first gore, except drafting the hip-curves, which is done with another instrument.

The second and third gores are drafted in the same manner as above described for the front gore, and for gores of various widths or angularity rule C is swung outwardly to any one of the indicating-lines D, E, F, G, and H on quadrant B' B², as may be desired.

In drafting the godet or back gore slide J is slid inwardly to the pivotal center C' of rule C, which in practice is two inches from the naught or zero mark on arm B, as before stated.

The back-measure of length of gore, as indicated on the tape-measure, is always set at the number indicating the waist-measure in the Godet scale A³ A⁴, instead of at some number in scale A' A², as in the other gores.

The top and bottom of the gores are scribed with the slide J at the zero-mark on arm B if the back and front lengths are the same; but if the front of the skirt is longer than the back scribe the bottom of the gores with slide J at zero and scribe the top thereof with the slide as much to the right-hand side of zero, Fig. 1, as the front is longer than the back.

If the back is longer than the front, scribe the top from zero and the bottom from a point as far to the right of the scale as the back is longer than the front. This instrument is adapted to use in drafting any desired number of gores for a skirt, and would be useful in laying out the gores for conical sheet-metal work.

I claim as my invention—

1. In an instrument for laying out gores for skirts, a stationary rule and an adjacent movable rule pivotally connected therewith, the adjacent faces thereof radially disposed relatively to said pivotal connection, the stationary rule having a lateral projection upon which is mounted a clamp adapted to adjustably hold one end portion of a measuring-tape, and to slide substantially radial, relative to the said pivotal center, for the purpose stated.

2. In an instrument for laying out gores for skirts, a stationary rule having an arm projecting laterally therefrom at one end, and a movable rule pivotally mounted adjacent to the stationary rule so that the opposing faces of the two rules are substantially in line with the pivotal center of the movable rule, in combination with a clamp having a measuring-tape attached thereto and adapted to be supported, and slid on the said lateral projection of the stationary rule substantially radial relative to the pivotal center of the movable rule, for the purpose stated.

In testimony that I claim the foregoing I have hereunto set my hand, this 22d day of September, 1897, in the presence of witnesses.

EDWARD P. FOLLETT.

Witnesses:
  J. A. WEST,
  S. L. WILLIAMS.